INVENTOR
Norbert OHLE
By Toulmin & Toulmin
ATTORNEYS

INVENTOR
Norbert OHLE

By: Toulmin & Toulmin
ATTORNEYS

2,980,062

CONTROL DEVICE FOR INFLUENCING THE ROCKING MOVEMENT OF MACHINE PARTS IN FOUNDRY MACHINES

Norbert Ohle, Ratingen, Germany, assignor to Firma Gustav Zimmermann Maschinenfabrik G.m.b.H., Dusseldorf-Rath, Germany Filed Dec. 2, 1957, Ser. No. 700,156

Claims priority, application Germany Nov. 30, 1956

10 Claims. (Cl. 121—38)

This invention relates to foundry machines and more particularly to an apparatus serving to control the swivel or rocking movement of a heavy part or parts, such as, for instance, the turn-over arm in molding machines or of the counter-pressing head, beam or spar of such machines.

In order to carry out the swivel, tilting or rocking movement of such heavy parts it is necessary to impart the required acceleration to the heavy mass of the said part or parts as rapidly as possible in order to save time. In the machines known in the art this has been achieved by the use of a correspondingly large driving cylinder which, however, supplies energy to the movable part in such amounts, that it is difficult to brake the resulting movement satisfactorily during the last phase thereof in order to stop the heavy part prior to returning the same to its initial position. In the known machines, the swivel movement is either not braked sufficiently to avoid an abrupt halting of the heavy movable part and, consequently, a strong shock is imparted to the entire machine, or the turning or tilting movement must be carried out slowly enough to avoid shocks, whereby valuable working time is lost.

It is the object of my invention to provide a novel device for controlling the swiveling, tilting or rocking movement of a heavy machine-part or parts of a foundry machine, in particular of a molding machine and the like, so as to avoid shocks to the machine and obtain a smooth operation of the movable part or parts without loss of working time.

It is another object of my invention to provide a novel device for swiveling, tilting or rocking heavy part or parts of foundry machines and, in particular, in molding machines, which drive effects a turning, rocking or tilting movement of the said heavy part or parts, which movement is accelerated with satisfactory rapidity and especially rapidly braked during the final phase of the movement of the heavy part or parts so as to save operating time and to avoid shocks to the entire machine.

These objects are obtained and the above-mentioned drawbacks of the known machines avoided by the control device according to my invention which comprises means for braking the turning, tilting or swiveling movement of a heavy machine part or parts in particular of a molding machine, during the end phase of that movement.

According to another feature of my invention, the aforesaid control means may also serve for additionally influencing the tilting, rocking or swiveling movement of the heavy part or parts by accelerating this movement during the initial phase thereof. The braking effect of the control device sets in due to a corresponding reversal of the course or direction of the movement of the control device.

In combination with the control device according to my invention, a foundry machine comprises a known main driving device for turning, tilting, or swiveling the heavy machine part or parts by engaging in any desired manner a main shaft on which the said part or parts are mounted. The control device proper comprises coupling means provided on the aforesaid main shaft which may consist of a crank, a crank disc, a slide guide or the like, and which means operatively connect the main shaft to the power transmitting means of the control device. The power transmitting means functions in such a manner that it acts preferably on the main shaft in the same direction or with a torque acting in the same direction as the aforesaid main driving device during the first part of the movement of the heavy part or parts, while, toward the end of the movement of the part or parts, it acts in the opposite direction or with an opposed torque.

In another embodiment of my invention I provide a molding machine comprising as a first heavy turnable part, a mold turnover device, turnable about a horizontally disposed axis, and, in the upper portion of the turnover device, as a second heavy part, a counter pressure beam which can be swiveled about a vertical axis, as well as control devices according to my invention, which co-operate with the turnover device on the one hand, and with the counter pressure beam on the other hand. The control device may comprise a piston and may be driven in any desired manner, for example by means of its own compressed fluid drive which acts on the piston, or else by means of a spring driving the piston and tensioned during the end or braking phase. Thus, for example, a crank may be disposed on the main shaft, and during the rocking or tilting movement of the heavy part from one end position to the other end position, the said crank will cause the piston which is articulated on the crank pin, to perform a reciprocating lifting movement. From one end position of the crank pin to the top center of the crank circle, an additional driving momentum is thus transmitted as an initial acceleration by the piston to the main shaft, while from the top center of the crank circle to the other end position of the crank pin, a braking momentum is thus produced which causes a soft braking of the main shaft.

The construction and provision of a control device according to the invention, serving preferably simultaneously as a starting acceleration device and an end braking device, in conjunction with the rocking or tilting drive of heavy machine parts in a foundry machine, offers the advantage of initiating the rocking movement in a very short time in each case and of increasing its speed to the requisite value, while, on the other hand, the end phase of the rocking movement is braked softly and with satisfactory rapidity. At the same time, the rocking or tilting movement can be initiated and carried out with a driving device of normal size, since it is no longer necessary to enlarge this driving device for the purpose of an initial acceleration of the rocking or tilting movement.

The extent of the rotation or rocking movement of the heavy part may, under these circumstances, differ and extend, for example, over angles ranging from 90°–270°.

The nature and operation of the control device according to my invention will be still better understood from the subsequent description thereof in connection with the accompanying drawings in which.

Figure 1:
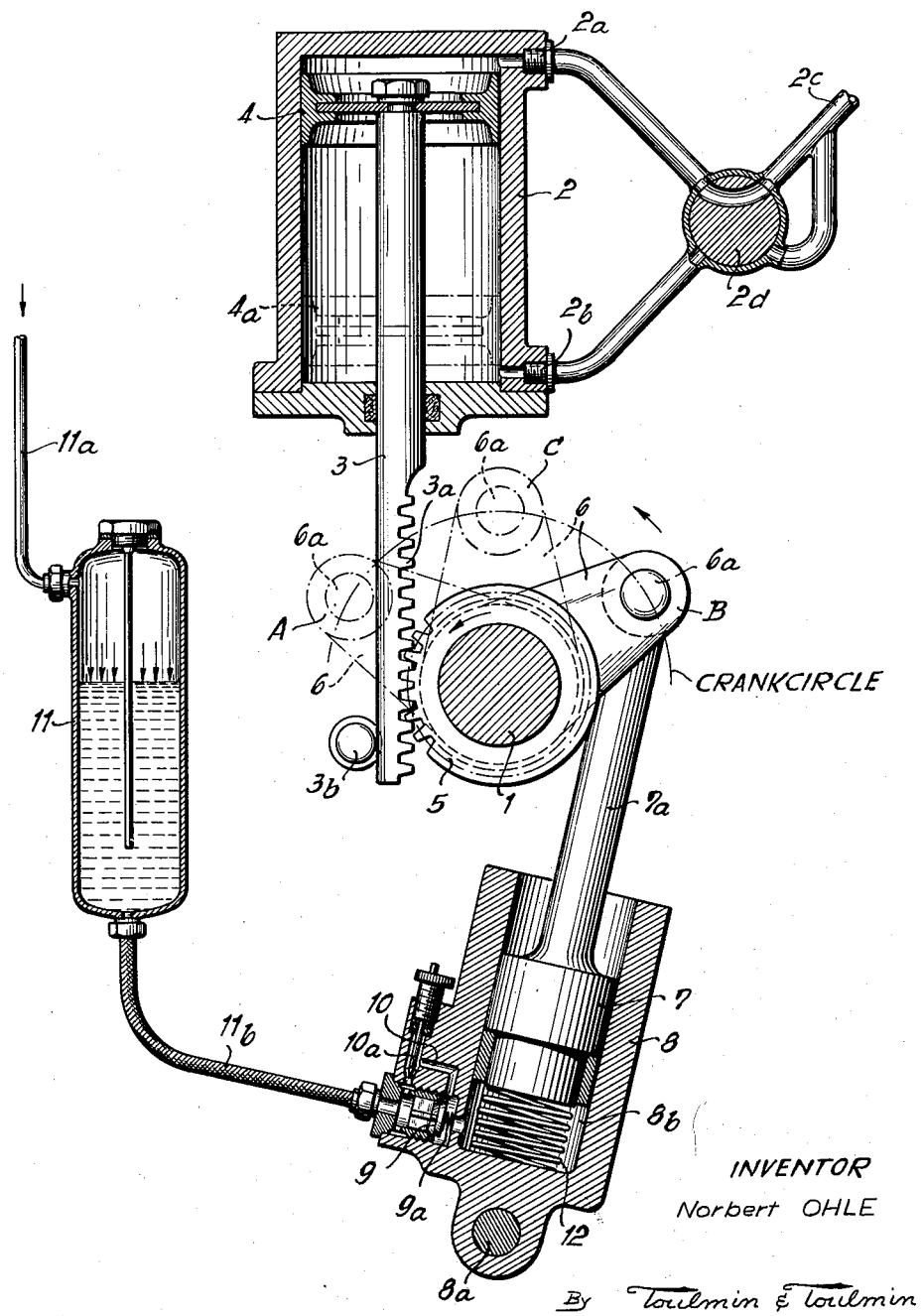
Figure 1 illustrates schematically in cross-sectional view the drive for the main shaft bearing a heavy turnable part of a foundry machine and an embodiment of the control device according to my invention provided therewith.

Referring now to the drawings more in detail, and in particular to Figure 1, a heavy machine part (not shown) of a foundry machine is turnable or tiltable, via conventional means, by a corresponding rotation of a main rocking or tilting shaft 1.

The rotary movement of this shaft 1 is produced by the upward or downward movement of a driving piston 4 in a stationary cylinder 2, and a piston rod 3 which bears at its free end outside the piston a toothed segment or rack 3a. The free end of piston rod 3 is guided by a supporting roller 3b and engages a gear 5 which is rigidly mounted on the main shaft 1. The reversal of compressed air admitted to the driving cylinder 2 is effected in a conventional manner, for instance, by feeding air from a compressed air line 2c via control valve 2d either to inlet 2a or to inlet 2b. The exhaust valve means for the cylinder are not shown.

A crank 6 is also rigidly mounted on main shaft 1 and is articulatedly connected at 6a to the piston rod 7a of a piston 7 which is adapted for reciprocation in an oscillating cylinder 8 which is pivotably mounted on a a cylinder supporting shaft 8a.

A reservoir 11 contains a pressure fluid, the surface of which is subjected to the pressure of compressed air admitted through pressure line 11a. Reservoir 11 is connected through a flexible line 11b with a non-return valve 9 through which fluid under pressure from reservoir 11 is admitted to the interior chamber 8b of cylinder 8.

Non-return valve 9 is urged into closed position by means of valve spring 9a, and is by-passed through channel 10 and throttle 10a provided in the wall of cylinder 8. Furthermore, piston 7 may be tensioned by providing behind the same in chamber 8b a tension spring 12.

As piston 4 moves downwardly into the position shown in dashed and dotted lines at 4a shaft 1 is rotated counterclockwise and piston 7 moves upwardly and to the left following the counterclockwise movement of crank 6 and describing a crank circle. Simultaneously pressure fluid passes through valve 9 into chamber 8b and supplies additional acceleration to piston 7 and via crank 6 to shaft 1 while the crank 6 moves from position B to the top center position C.

The resulting torque exerted by piston 7 on main shaft 1 is directed in the same direction as the torque exerted by piston 4 on shaft 1. The co-operation of the two momenta does produce a rapid acceleration of the rotary movement of the main shaft 1 and the heavy machine part moved by the latter during the starting phase of the operation.

At the top center C of the crank circle of the crank 6, the movement of piston 7 is reversed, the non-return valve 9 closes, and the fluid behind the piston 7 is forced back through channel 10 and throttle 10a into line 11b and into the reservoir 11, until crank 6 has reached its other end position A, thus producing the pressure required for the braking momentum. The actual braking takes place by the displacement of this liquid through the throttle 10a.

The additional starting momentum can also be augmented by providing spring 12 behind piston 7 which spring is prestressed by the energy liberated during the braking phase.

The same initial accelerating and final braking effect occurs during movement of piston 4 of the main drive from position 4a upwardly, whereby crank 6 moves from position A on the crank circle through top center C back to position B. During the initial phase from A to C, piston 7 moves upwardly in cylinder 8 aided by pressure from spring 12 and from compressed fluid urged through line 11b and valve 9 into chamber 8b. After passing top center C, piston 7 is braked by acting against the fluid pressure in 11, and urging fluid through channel 10 and throttle valve 10a, and by compressing spring 12. The braking effect is transmitted via crank 6 to shaft 1, and the movement of the heavy part operated by the latter, is effectively and rapidly braked.

The forming machine illustrated in Figures 2 to 6 comprises a stationary part provided with a casing 15, and a turnover device having a casing 13, which is rigidly connected to the head flange 14a of shaft 14. Shaft 14 is supported by means of rolling contact bearings 16 and 17 in corresponding openings of casing 15. The turnover device comprises a known mold supporting and vibrating part 18, and, in its top portion (while in the position shown in Figure 2) the counter pressure head beam 19. The latter part is rotatable about a shaft 20 which extends perpendicularly to shaft 14.

The heavy turnover device comprised by casing 13 is rotated together with shaft 14 to assume a position in which portion 18 of the turnover device is at the top and portion 19 thereof at the bottom, in recess 51 of foundation 50. Shaft 14 is turned by means of a drive which comprises main cylinder 21 having pressure fluid inlet openings 21a and 21b, a piston 22 reciprocatingly housed in cylinder 21, a piston rod 23 rigidly connected to the piston 22 and extending with its free end upwardly and bearing a toothed segment 24 thereon which engages a gear 25 rigidly connected by a key 25a to shaft 14. Cylinder 21 is pivotably mounted on shaft 52 supported in the bottom portion of opposite walls of casing 15 and being parallel to shaft 14.

On the same shaft there is pivotably mounted the cylinder 26 of the control device according to my invention co-operating with the main drive of shaft 14 and braking and eventually accelerating the turnover movement of shaft 14 and the turnover device 13, 18, 19 connected thereto.

Cylinder 26 of my control device houses piston 27 and piston rod 28, the free end of which rod is connected by means of pin 29 to crank 30 which is rigidly connected by means of keys 30a and 30b to shaft 14.

Figure 2:
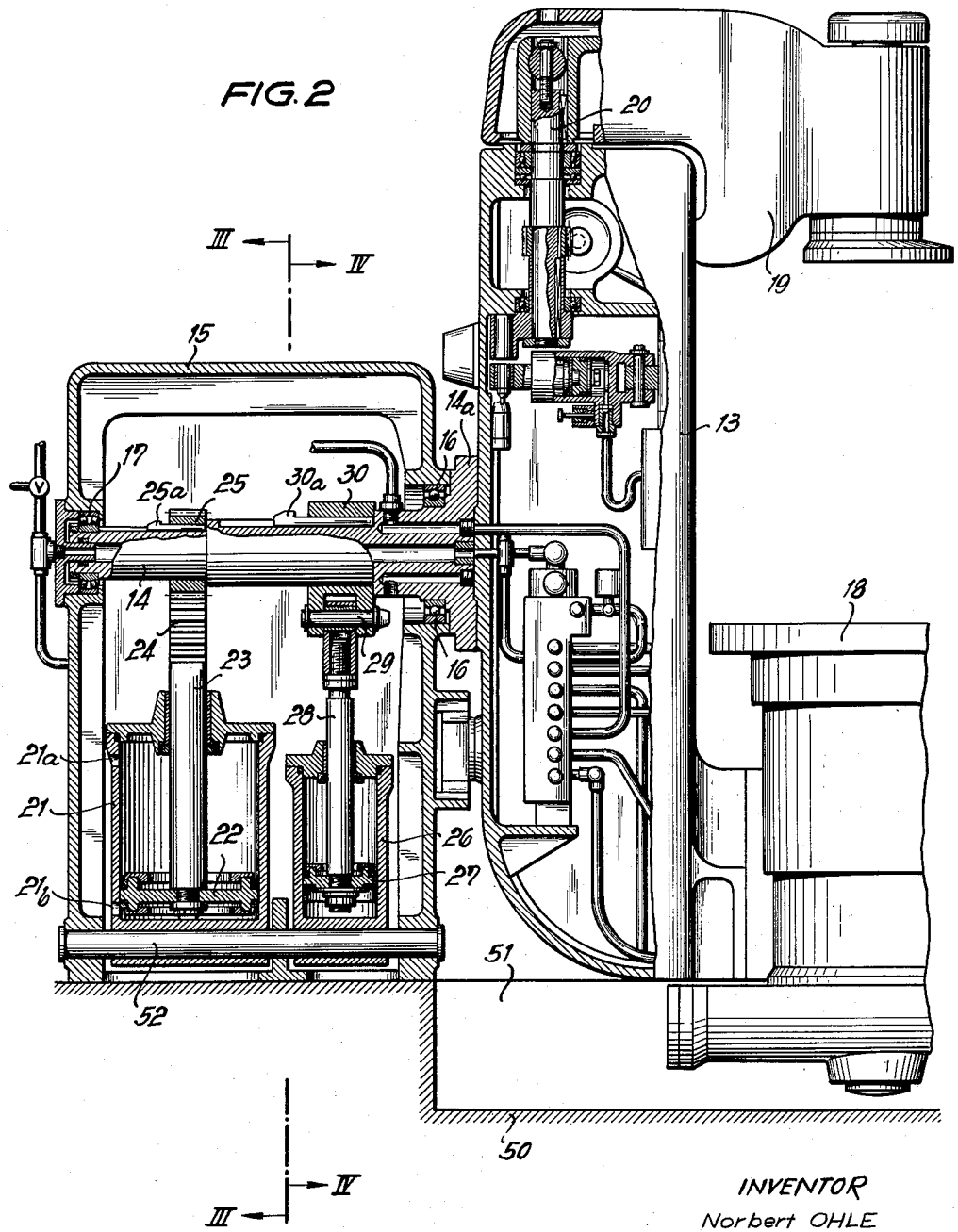
Figure 2 is a sectional lateral view of a molding machine having a mold turnover device and a swivable counter pressure beam therein, and control devices according to my invention provided with the turnover device as well as the counter pressure beam.
Figure 3:
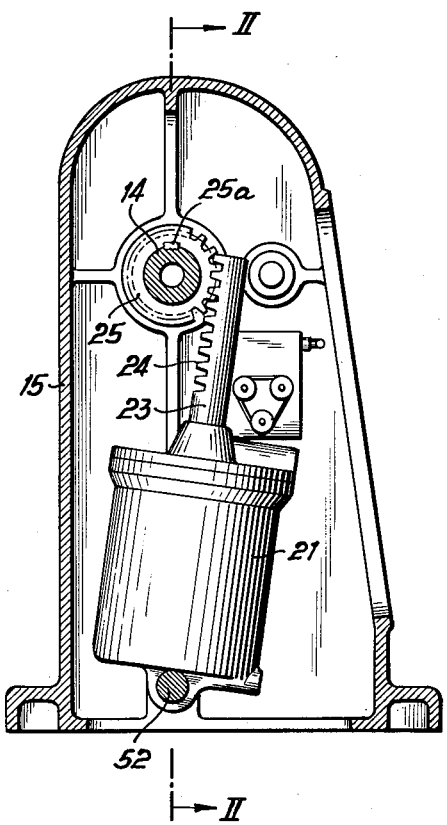
Figure 3 is a cross-sectional view of the drive for the turnover device, taken along line 3—3 in Figure 2.
Figure 4:
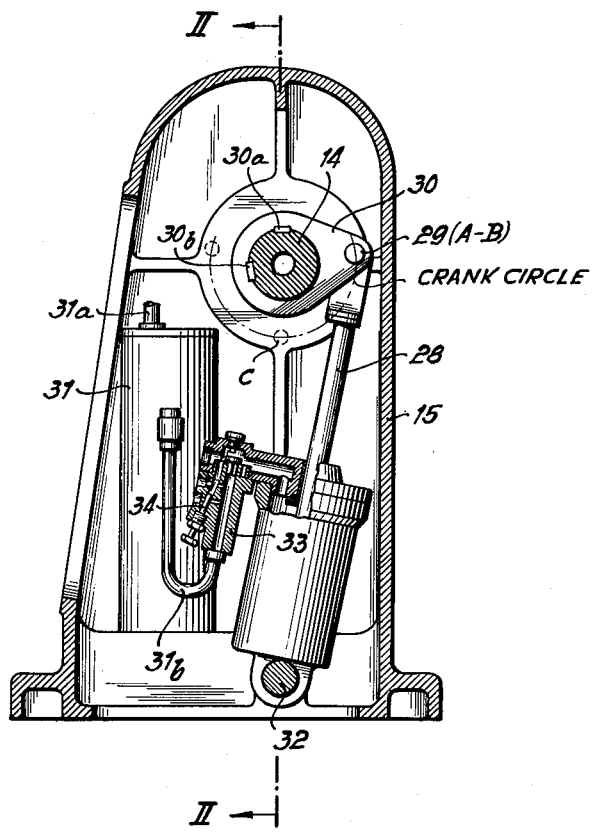
Figure 4 is a cross-sectional view of the drive for the turnover device, taken along line 4—4 in Figure 2.

The operation of this control device which is supplied with fluid from reservoir 31 through pipe line 31b and valve 33 provided with by-passed channel and throttle means 34 is the same as in the embodiment illustrated in Figure 1. It is to be noted that, in Figure 2, pin 29 is shown in bottom center position which corresponds to position C in Figure 1, while turnover device 13, 18, 19 should be in horizontal position when pin 29 is in bottom center position C. The correct position of pin 29 which corresponds to the position of the turnover device shown in Figure 2 is illustrated in Figure 4 and corresponds to positions A or B of Figure 1. Compressed air is admitted to the reservoir through pipe line 31a. The source of compressed air for the operation of piston 22 and to be fed to line 31a is not shown.

Figure 5:
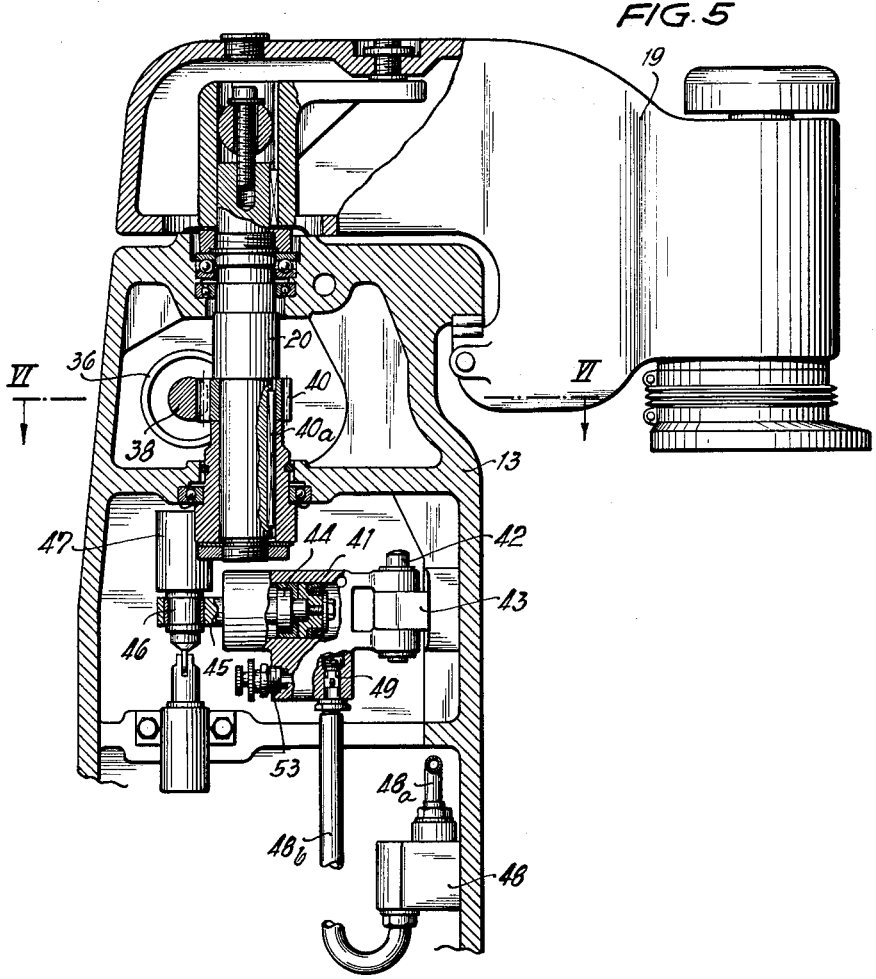
Figure 5 is an enlarged fractional view, in cross section, of the head portion of the turnover device, taken in the same plane as Figure 2.
Figure 6:
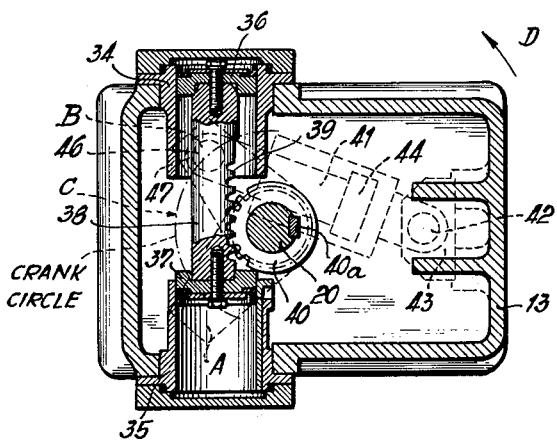
Figure 6 is a sectional plan view of the head portion of the turnover device, taken along line 6—6 in Figure 5.

As illustrated in Figures 5 and 6 the swivel movement of counter pressure beam 19 about perpendicular shaft 20 is effected by a beam drive comprising cylinders 34 and 35 in which double acting pistons 36 and 37 reciprocate. These pistons 36 and 37 are attached to the ends of a common piston rod 38 which bears a rack portion 39 and engages by means of the latter a gear 40 mounted rigidly on shaft 20 by a key 40a. A control device according to my invention co-operates with the main drive means 36, 37, 38 of shaft 40 and comprises an oscillating cylinder 41 pivotably mounted on a shaft 42 supported in a bearing 43 which is attached to the interior wall of casing 13. Cylinder 41 houses a piston 44 which is connected by means of piston rod 45 to the pin 46 of crank 47. Pressure fluid is urged by means of compressed air through inlet pipe 48a from reservoir 48 through a flexible pipe 48b and check valve means 49 into the interior of cylinder 41 behind piston 44. By-passed channel and throttle means 53 are associated with check valve 49 in the same manner as illustrated in Figures 1 and 4. The actuation of the control device according to my invention shown in Figures 5 and 6 is exactly the same as that illustrated in Figure 1, pin 46 being shown in position B on the crank circle, which position corresponds to that of the counter pressure beam 19 in Figures 2 and 5. As pin 46 passes through dead center C, piston 44 has reached its outermost position in cylinder 41, and as pin 46 reaches position A in Figure 6, the counter pressure beam 19 is swiveled away from the position shown in Figures 2 and 5 to a position indicated by arrow D in Figure 6.

The control device according to my invention can be varied in many ways without departing from the basic concept thereof. Thus, the pressure exercised by the control piston on the crank could be replaced by a device in which a pull is exerted on the same. Furthermore, the accelerating and braking device could also be made adjustable or automatically self-adjusting for the braking in dependence on the movement.

If, for example, the machine part to be rocked is top-heavy, it being necessary, for example, for different sizes of molding boxes having different weights to be rocked or swiveled, the throttling device 10a may be so arranged that it automatically adjusts itself in dependence on the movement in such manner that braking forces of different magnitude are produced in the two directions of rocking.

It will be understood, that further changes and modifications may be made without departing from the spirit of the invention and the scope of the appended claims.

I claim:
1. In a control device, the combination which comprises: an oscillatable axle; driving means for oscillating said axle between two end positions; and auxiliary driving means associated with said axle and movable therewith between said two end positions as well as past an intermediate dead center position for producing rotation of said axle while said auxiliary driving means move from either of said end positions to said dead center position and for retarding rotation of said axle while said auxiliary driving means move from said dead center position to either of said end positions.

2. Apparatus as claimed in claim 1, wherein the auxiliary driving means comprises a cylinder and a piston movement of which is effected by a liquid or gaseous medium which is supplied to the cylinder via a non-return valve.

3. Apparatus as claimed in claim 2, wherein movement of the piston is effected by means of a liquid which is placed under the pressure of compressed air.

4. Apparatus as claimed in claim 1, wherein the auxiliary driving means comprises a cylinder and a piston, movement of which is effected by means of a spring, the liquid required during the retarding phase being drawn into said cylinder by said piston via a non-return valve, and the movement of said piston during the retarding phase pre-stressing said spring.

5. Apparatus as claimed in claim 3, wherein the retarding is effected by means of ejecting the liquid from the cylinder through a throttled outlet.

6. In a control device, the combination which comprises: an axle oscillatable about an axis of rotation; driving means for oscillating said axle between two end positions; and auxiliary driving means comprising a cylinder member having a piston member slidably arranged therein, one of said members being connected to a crank carried by said axle and the other of said members being mounted for pivotal movement about a pivot axis which is parallel to said axis of rotation and which is so positioned that the linkage constituted by said members and said crank is in dead center position when said axle is in a position intermediate its two end positions, and means for producing sliding movement of said members relative to each other when said axle rotates from either of its end positions to said intermediate position at which said linkage is in its dead center position and for retarding sliding movement of said members relative to each other when said axle rotates from said intermediate position thereof to either of its end positions.

7. The combination defined in claim 6 wherein said means for producing and retarding sliding movement of said cylinder and piston members relative to each other comprise means for supplying by way of a non-return valve a fluid under pressure into said cylinder member on the head end side of said piston member which forms one wall of that chamber in said cylinder that, during the assisting phase of the sliding movement, increases in size.

8. In a control device, the combination which comprises: an axle oscillatable about an axis of rotation; driving means for oscillating said axle between two end positions; and auxiliary driving means comprising a cylinder member having a piston member slidably arranged therein, one of said members being connected to a crank carried by said axle and the other of said members being mounted for pivotal movement about a pivot axis which is parallel to said axis of rotation and together therewith defines a plane that passes through the respective end positions of the connection between said crank and said one member while said axle is in its respective end positions so that the linkage constituted by said members and said crank is in dead center position when said axle is in a position intermediate its two end positions, and means for producing sliding movement of said members relative to each other when said axle rotates from either of its end positions to said intermediate position at which said linkage is in its dead center position and for retarding sliding movement of said members relative to each other when said axle rotates from said intermediate position thereof to either of its end positions.

9. In a foundry machine, the combination which comprises: a turnover device having an axle which is oscillatable between two end positions corresponding to two operative positions of said turnover device, driving means for oscillating said axle between said two end positions; and auxiliary driving means associated with said axle and movable therewith between said two end positions as well as past an intermediate dead center position for producing rotation of said axle when said auxiliary driving means move from either of said end positions to said dead center position and for retarding rotation of said axle while said auxiliary driving means move from said dead center position to either of said end positions.

10. The combination defined in claim 9 wherein said turnover device carries a mold supporting and vibrating part and a counter pressure head beam.

References Cited in the file of this patent
UNITED STATES PATENTS

| | | |
|---|---|---|
| 524,542 | Dewson | Aug. 14, 1894 |
| 619,350 | Rowntree | Feb. 14, 1899 |
| 1,443,200 | Adams | Jan. 23, 1923 |
| 2,470,415 | Seborg | Mar. 17, 1949 |